US005614923A

United States Patent [19]

Gotou et al.

[11] Patent Number: 5,614,923

[45] Date of Patent: Mar. 25, 1997

[54] DRIVE APPARATUS FOR A LIQUID CRYSTAL DISPLAY SCREEN

[75] Inventors: Tatsushi Gotou; Kazuyuki Murase; Hideki Yamanaka, all of Kanagawa-ken, Japan

[73] Assignee: Kabushiki Kaisha Toshiba, Kanagawa-ken, Japan

[21] Appl. No.: 274,531

[22] Filed: Jul. 13, 1994

[30] Foreign Application Priority Data

Jul. 14, 1993 [JP] Japan .................................... 5-174097

[51] Int. Cl.[6] .............................. G01G 3/36; G09G 5/00; G09G 5/36

[52] U.S. Cl. ................................ 345/99; 345/98; 345/95; 345/100; 345/104

[58] Field of Search ............................... 345/98, 95, 132, 345/99, 100, 104, 38

[56] References Cited

U.S. PATENT DOCUMENTS 5,276,458 1/1994 Sawdon .................................. 345/132

5,363,118 12/1994 Okumura ................................ 345/95

*Primary Examiner*—Raymond J. Bayerl
*Assistant Examiner*—Kuniki C. Lockett
*Attorney, Agent, or Firm*—Finnegan, Henderson, Farabow, Garrett & Dunner, L.L.P.

[57] ABSTRACT

An improved drive apparatus for a LC display screen is provided. The inventioned drive apparatus includes a programmable time setting means for changing drive currents in accordance with the size of the LC display screen. Depending upon the size of the LC display screen, it is necessary to change the drive current for charging up the display as promptly as possible at an initial stage of operation. The inventioned drive apparatus includes at least one time setting register means for programmably pre-setting a time according to the size of the display screen and a circuit selection means for providing a low resistor selection signal and a high resistor selection signal in accordance with the pre-set time of the time setting means.

12 Claims, 5 Drawing Sheets

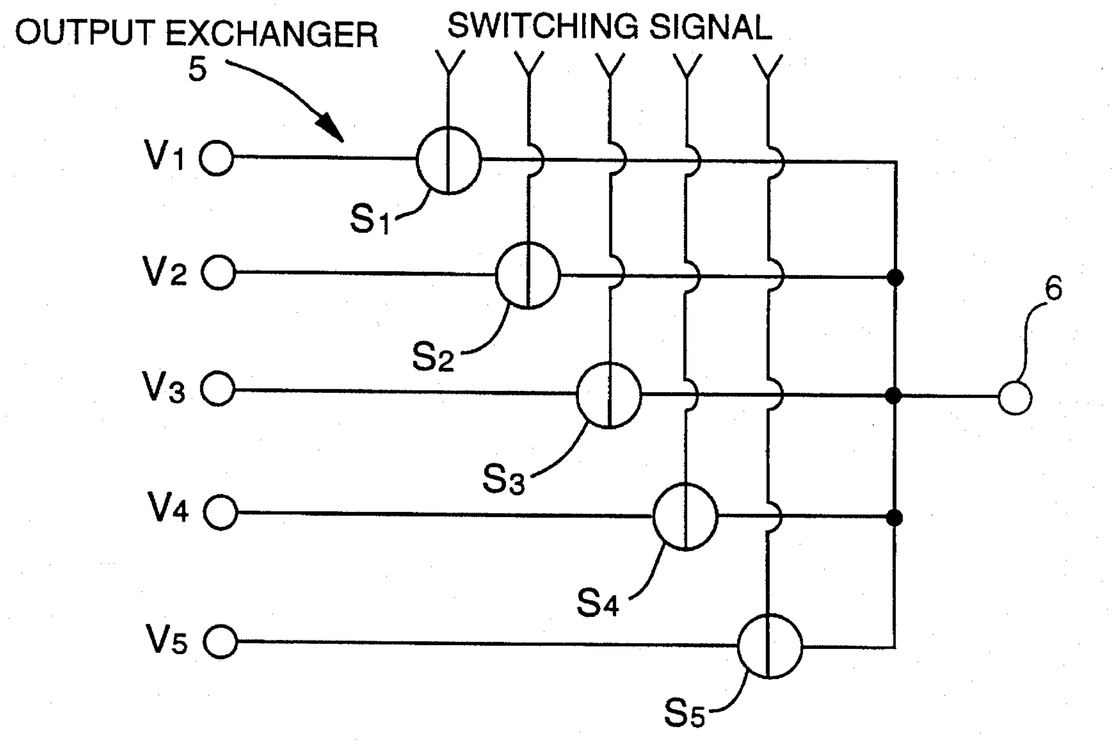
FIG. 4
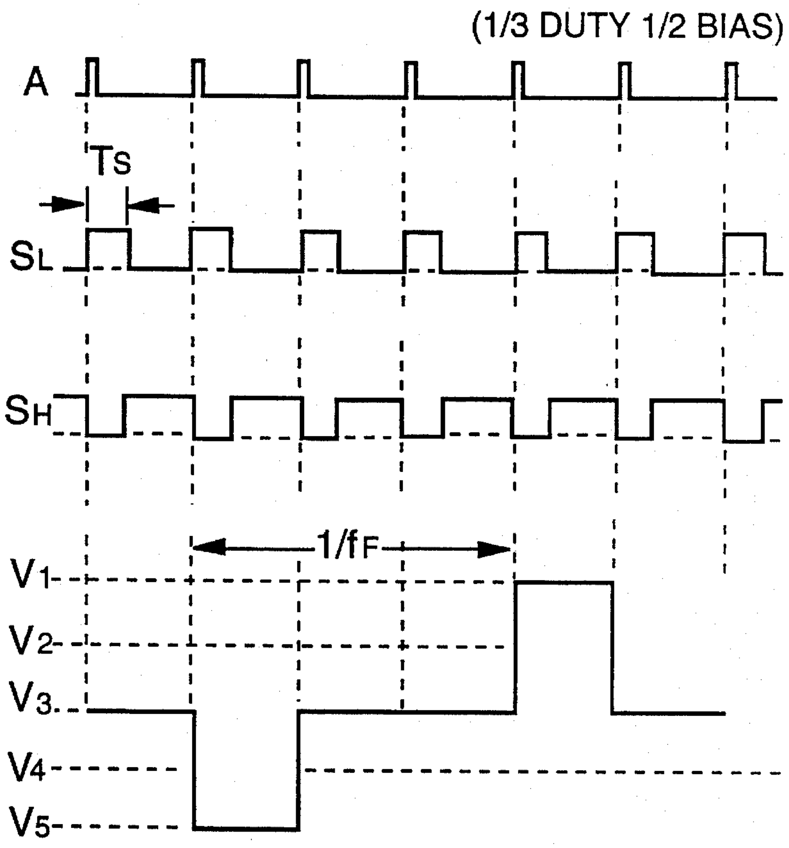
FIG. 5(a)
FIG. 5(b)
FIG. 5(c)
FIG. 5(d)

DRIVE APPARATUS FOR A LIQUID CRYSTAL DISPLAY SCREEN

FIELD OF THE INVENTION

This invention relates to a drive apparatus for a liquid crystal display screen for using, for example, a display for a wrist watch, a manometer and a personal computer system and so on, and more particularly to such an improved drive apparatus which is programmably or freely changeable its drive power according to a screen size of a liquid crystal display.

ART BACKGROUND

It is a technique for a drive apparatus for a liquid crystal display (hereinafter LC display) screen to generate a step-wise changing drive voltage which varies its values and changes its poralities responsive to a frame frequency.

It is also inevitable for a battery drive apparatus, like a wrist watch, to supply a relative large current at an initializing or starting stage of the operation of the LC display screen in order to charge up as promptly as possible. During a stable operation. However, it is desirable for the drive apparatus to supply a relative small current supply in order to reduce the power consumption.

In order to achieve such operation, a drive apparatus for a LC display screen usually includes a resistor circuit so as to supply a large current through a relative low value of a resistor (hereinafter referred to as a low resistor) at a starting stage of operation of a LC display and then change to supply a small current through a relative high value of a resistor (hereinafter referred to as a high resistor) during a stable term of an operation.

A conventional drive apparatus usually has a fixed duty ratio of the time for to changing the high power supply compared to the time for the low power supply, in order to drive a particular size of a LC display apparatus.

Accordingly, a conventional drive apparatus for a LC display is limited to single use in a particular condition. Consequently, it is impossible to change a drive power according to a size of a LC display screen.

In order to do so, for a conventional drive apparatus, it is necessary to change a frame frequency for a LC display screen or to mount an additional slit resistor element outside. Otherwise, an additional high drive power IC needs to be changed outside when a LC display is changed to a large size of a screen from a small one.

However, such conventional techniques have severe problems. When a frame frequency for a display is reduced in order to change a screen size of a LC display, noisy flickers appear on a LC display screen.

For example, in a case of a wrist watch, when a frame frequency is reduced extremely, such flikers appear on a screen.

It is also another problems to mount an additional slit resistor or a high power IC outside. In such a case, it causes to become a problem for a packaging space of a drive unit. And even if a space problem is cleared, it is inevitable to cost up of the total cost of a display apparatus.

Accordingly, an object of this invention is to provide an improved LC display drive apparatus which can programmably or freely change its drive power according to the screen size of the LC display apparatus.

It is also an object of this invention to provide an improved driver means for a LC display which can programmably set a time for a high power supply and a time for a low power supply.

It is further object of the invention to change freely a switching time between a high power supply and a low power supply without any additional mounting of resistors or ICs outside according to a screen size of a LC display.

SUMMARY OF THE INVENTION

The present inventioned drive apparatus for a LC display includes at least one time setting means for programmably pre-setting a time according to the size of the screen, a circuit selection means for providing a low resistor selection signal and a high power selection signal in accordance with the pre-set time od the time setting means and resistor circuit means including at least one first circuit block having a low resistor and a first switching element coupled to one end of the low resistor in series and at least one second circuit block having a high resistor and a second switching element coupled to one end of the high resistor in series. The first and second circuit blocks are coupled in parallel between a power source and a reference source for providing at least one output voltage.

The circuit selection means is coupled selectively to apply the low and high resistor selection signals to said first and second switching elements, respectively, to provide the at least one output voltage through one one of the low and high resistors. Further, an output exchanging means including at least one switch element is positioned corresponding to the at least one output voltage from the resistor circuit means for providing the at least one output voltage to the display screen by switching the switch elements in response to a frame frequency for the display screen.

Since the inventioned drive apparatus can programmably change the pre-set time of the time setting means, the driving output voltages for any sizes of the LC screen can easily provided without any changing of the frame frequency or any additional mounting of a slit resistor or a high power IC outside.

Consequently, the conventional problems as mentioned before are completely overcomed by the invention.

BRIEF EXPLANATION OF THE DRAWINGS

FIG. 4 shows a brief composition of the output exchanger in FIG. 1.

FIGS. 5(*a*), 5(*b*), 5(*c*), 5(*d*), 6(*a*), 6(*b*), 6(*c*), and 6(*d*).

THE DETAIL EXPLANATION OF THE PREFERABLE EMBODIMENT OF THE INVENTION

Figure 1:
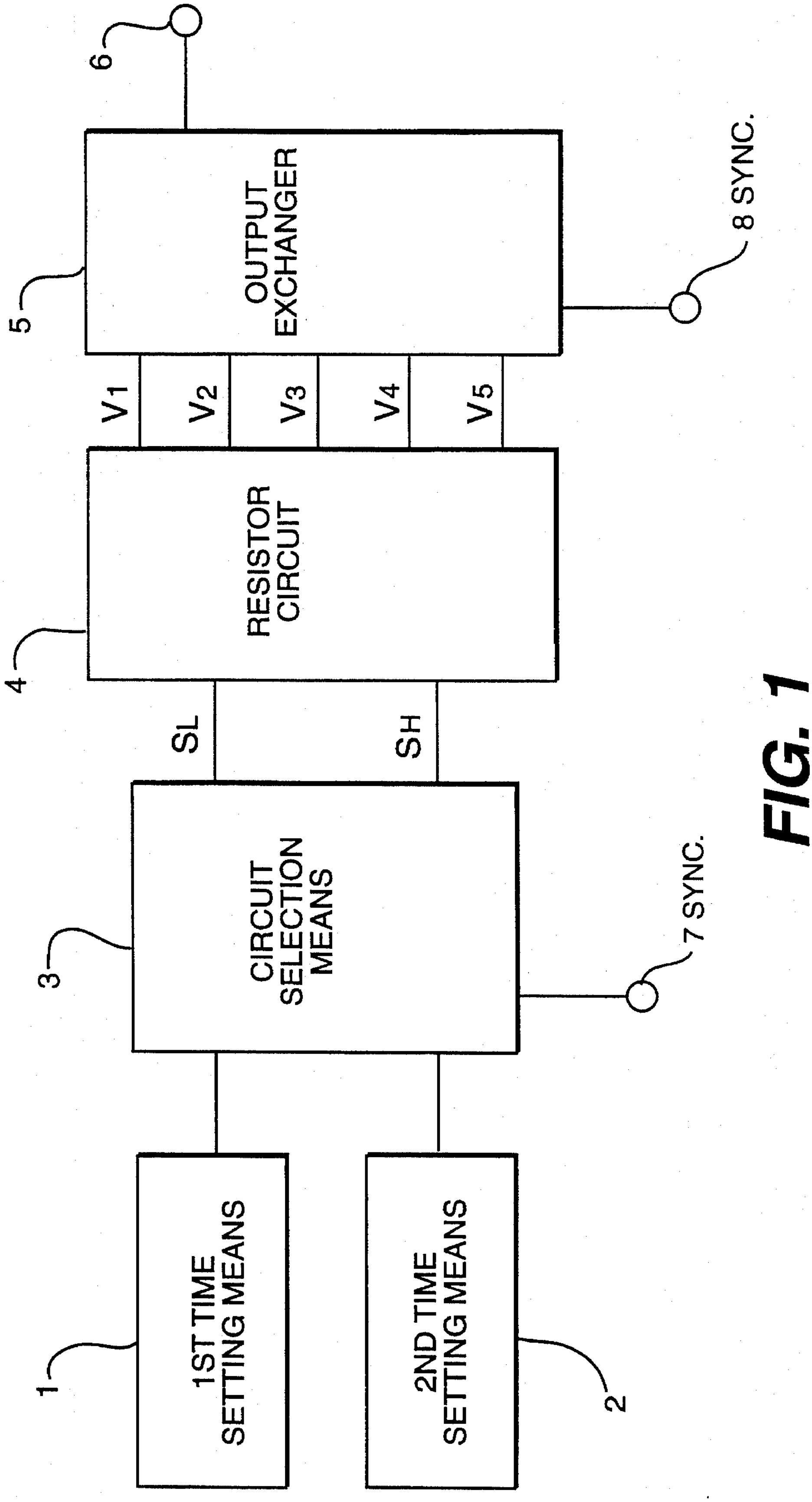
FIG. 1 shows a block diagram of the preferred embodiment of the invention.

FIG. 1 shows a schematic diagram of the preferred embodiment of the LC display drive apparatus according to the present invention. In this embodiment, a first time setting means 1 and a second time setting means 2 are provided for programmably pre-setting a low resistor selection time and a high resistor selection time, respectively. This time setting means comprises, for example, a resistor circuit for programming to hold the pre-set time.

The first time setting means 1 and the second time setting means 2 are coupled to a circuit selection means 3. The circuit selection means 3 supplies a low resistor selection signals SL and a high resistor selection signal SH in accordance with the pre-set time of the time setting means in responding to a synchronizing signal from an input terminal 7.

From the rise of the synchronizing signal, the circuit selection means 3 holds the low resistor selection signal SL at a high (H) level and the high resistor selection signal SH is maintained at a low (L) level during the pre-set time of the first time setting means 1.

The low resistor selection signal SL and the high resistor signal SH are supplied to a resistor circuit means 4. The resistor circuit means 4 includes at least one first circuit block having a low resistor and a first switching element coupled to the one end of the low resistor in series and at least one second circuit block having a high resistor and a second switching element coupled to one end of the high resistor in series.

The resistor circuit means 4 provides a plurality of output voltages V1, V2, V3 . . . , V5 to an output exchanging means 5 in order to supply a drive voltage to the LC display through an output terminal 6.

Figure 2:
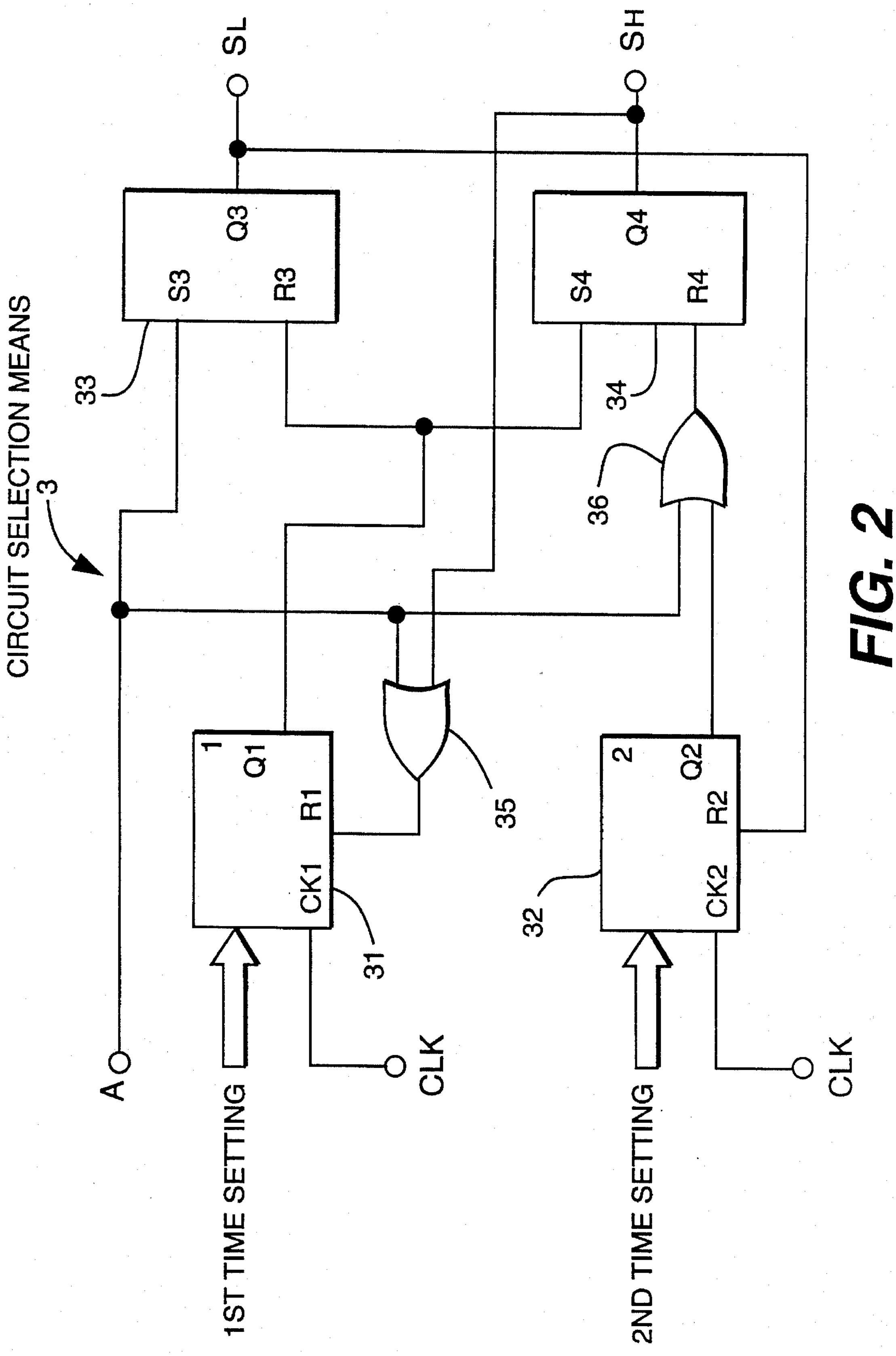
FIG. 2 shows a detail construction of the circuit selector in FIG. 1.

FIG. 2 shows a detail construction of the circuit selection means 3 in FIG. 1.

The first time setting signal from the first time setting means 1 in FIG. 1 is pre-set into a first counter 31 and a second time setting signal from the second time setting means 2 is pre-set into a second counter 32.

The first and second time setting signals are comprised of a plurality of bits, for example, 8 or 16 bits, respectively.

The counters 31 and 32 respectively count the input numbers of a clock signal CLK from the respective clock terminals CK1 and CK2. The first counter 31 holds its output terminal Q1 at low (L) level until the input numbers of the clock signal CLK count up the pre-set value.

The output signal from the terminal Q1 of the first counter 31 is supplied to a reset terminal R3 of a first flip-flop 33 and a set terminal S4 of a second flip-flop 34.

The set terminal S3 of the first flip-flop 33 is coupled to an input terminal A of a synchronizing signal. The synchronizing signal is also supplied to the respective input terminals of the first and second OR-gates 35 and 36.

The second input terminal of the first OR-gate 35 couples to the reset terminal R4 of the second flip-flop 34. And the second input terminal of the second OR gate 36 couples to the output terminal Q2 of the second counter 32.

When the counter 31 counts up the pre-set time or a next synchronizing signal inputs, the output level of the output signal Q1 turns to a high (H) level. Consequently, the first flip-flop 33 is reset to the low selection signal SL and the second flip-flop 34 provides the high resistor selection signal SH.

The second counter 32 also maintains its output signal from an output terminal Q2 at a low (L) level until the input clock number through the terminal CK2 reaches to the pre-set time.

The output terminal Q3 of the first flip-flop 33 is coupled to the reset terminal R2 of the second counter 32. The output signal Q2 of the second counter 32 is provided to the second input terminal of the second OR-gate transister 36. The output terminal of the second OR-gate 36 couples to the reset terminal R4 of the second RS flip-flop 34.

The output terminal Q4 of the second flip-flop 34 couples to the second input terminal of the first OR-gate 35. The reset terminal R1 couples to the first OR-gate 35.

The low resistor selection signal SL and the high resistor selection SH from the circuit selection means 3 are supplied to the resistor circuit means 4, respectively.

Figure 3:
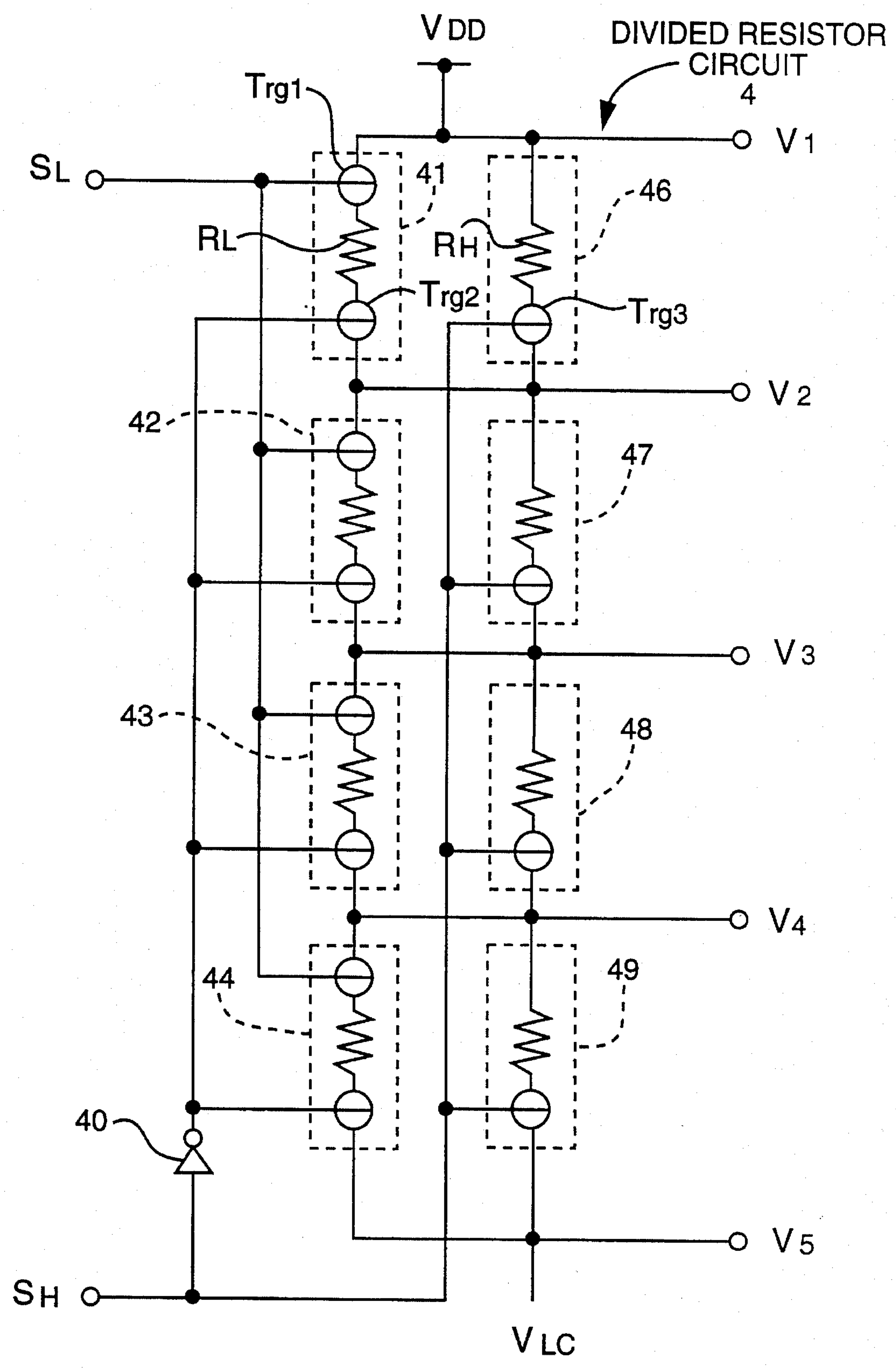
FIG. 3 depictes a detail construction of the resistor circuit in FIG. 1.

Referring now to FIG. 3, a detail structure of the resistor circuit 4 in FIG. 1 will be explained.

The resistor circuit means 4 includes at least one first circuit block having a low resistor RL and a first switching element coupled to one end of the low resistor in series, and at least one second circuit block having a high resistor RH and a second switching element to one end of the high resistor in series.

In the present embodiment, four of the first circuit blocks of the low resistor 41,42,43 and 44 are coupled in series. And four of the second circuit blocks of the high resistor 46,47,48 and 49 are coupled in series.

The first circuit blocks 41,42,43 and 44, and the second circuit blocks 46,47,48 and 49 are coupled in parallel between a power source VDD and a reference source VLC. Each of the first circuit block includes a low resistor RL and two of the first switching elements Trg1 and Trg2 coupled to both ends of the low resistor RL in series.

Each of the second circuit blocks include a high resistor RH and a second switching element Trg3 coupled to the reference voltage side of the high resistor in series. In the present embodiment, the transfer gate transistors are used as these first and second switching elements.

The low resistor selection signal line from the circuit selection means 3 couples to each of the transfer gate transisters Trg1 of the respective circuit blocks 41,42,43 and 44 which is connected to the power source side end of the low resistor RL.

The high resistor selection signal line from the circuit selection means 3 couples to each of the first transfer gate transister Trg2 of the respective circuit blocks 41,42,43 and 44 which is connected to the reference source side end of the low resistor RL through an inverter 40. Further, the high resistor selection signal line couples to the second transfer gate transister Trg3 of the respective circuit blocks 41,42,43 and 44 which is coupled to the reference source side end of the low resistor RL.

The low and high resistor selection signals are selectively applied to the first and second transfer gate transisters, respectively, in order to provide a plurality of divided output voltages V1, V2, V3, V4 and V5.

The divided voltages V1, V2, V3, V4 and V5 are coupled to an output exchanging means 5 in order to selectively provide the at least one divided output voltage through one of the low and high resistors to a LC display as shown in FIG. 4.

The output exchanging means 5 includes at least one switch element positioned corresponding to the at least one output voltage from the resistor circuit means 3 for providing the at least one output voltage to the display screen by switching the switch elements in response to a frame frequency of the display screen.

The switching signals control the selective switching operation of the switch elements S1, S2, S3, S4 and S5. In this embodiment, the synchronizing signal is applied as the switching signal.

The output voltage from the output exchanging means 5 vary its voltage value by the selective switching operation of these switching elements, and it turns its polarity with each cycle of the frame frequency.

Figures 6A, 6B, 6C, 6D:
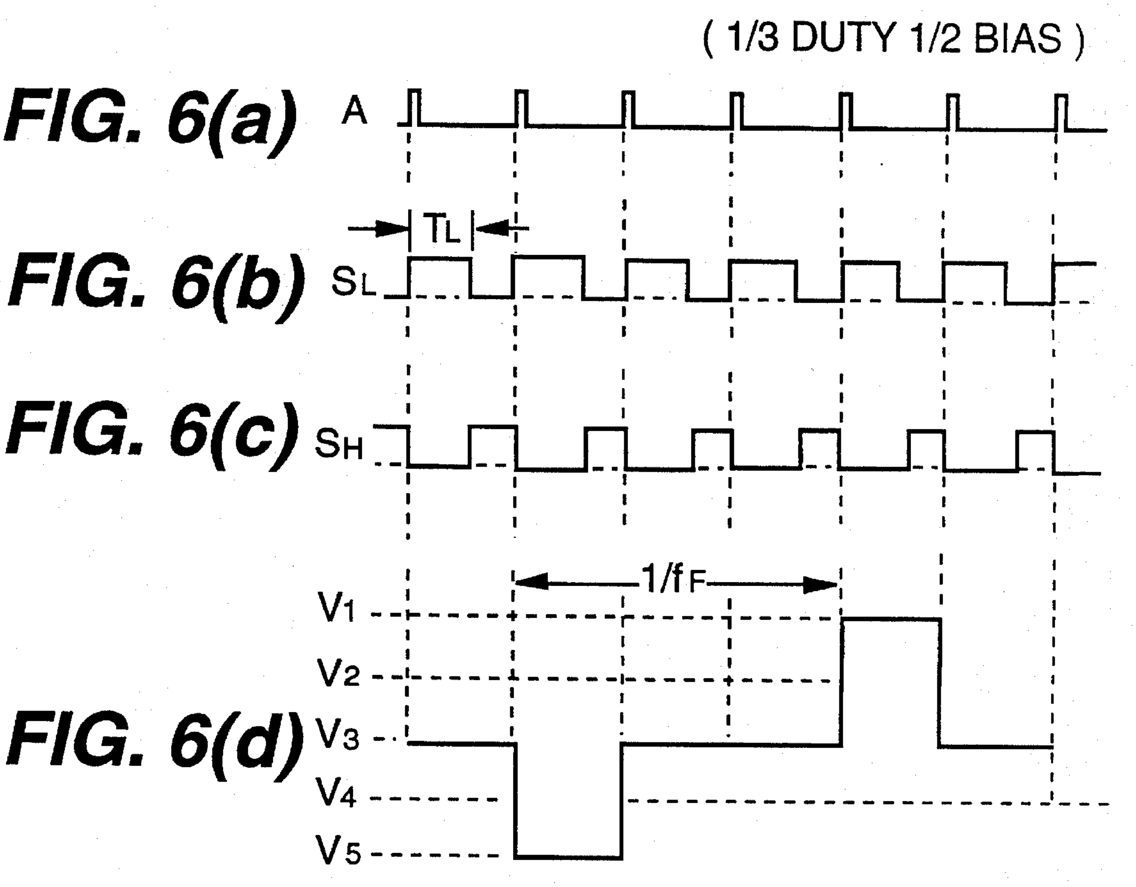

Referring now to FIGS. 5 and 6, the drive operation of the embodiment of instant invention drive apparatus will be explained. In this preferred embodiment, a LC display screen is driven, for example, by a so-called ⅓ duty and ½ mode. In this mode, a drive voltage changes its polarity in every third frequency cycle of a frame frequency and varies its potential level in every half of a source voltage.

FIG. 5 shows an operation of the embodiment of the present invention's drive apparatus for applying to a small size LC display screen and FIG. 6 explains a drive operation for a large size LC display screen.

FIGS. 5(*a*) and 6(*a*) indicates an input synchronizing signal supplied to the circuit selection means 3 and the output exchanging means 5 in FIG. 1.

The duty cycle of the synchronizing signal is three times as the duty cycle of the frame frequency. When a synchronizing signal A inputs to the first flip-flop 33, the low resistor selection signal SL becomes at a high level.

At that time, the high resistor selection signal SH from the second flip-flop 34 is maintained at a low level. Further the first counter 31 is also reset by the same synchronizing signal A and it begins to count the input numbers of a clock signal CLK until the number reaches to the value pre-set by a time setting means.

When the count number in the first counter 31 reaches the pre-set value, the counter output signal Q1 changes to a high (H) level. Accordingly, the output signal Q1 of the first counter 31 resets the first flip-flop 33 and also sets the second flip-flop 34.

That is, as shown in FIGS. 5(*b*) and 6(*b*), the low resistor selection signal SL maintains at a high level during the term TS which begins from a rise of a synchronizing signal. When the pre-set time TS has passed by counting the input numbers of the clock, the low resistor selection signal SL changes to a low (L) level and the high resistor selection signal SH becomes at a high (H) level. In this case, the time TS for a low resistor selection signal is shorter than the pre-set time TL for a high resistor selection signal due to the difference of the LC display screen sizes.

During the times TS and TL, since the low resistor selection signal SL is at "H" level and the high resistor selection signal SH is at "L" level, the first and second transfer gates Trg1 and Trg2 in each of the low resistor circuits 41 to 44 turns "on" and all of the third transfer gates Trg3 turn "off". Consequently, four of the low resistors are connected in serial between the power supply source VDD and the reference voltage source VLC.

Accordingly the five different values of voltages
V1(=VDD),
V2(=(VDD−VLC)×3/4+VLC),
V3(=VDD−VLC)/2+VLC),
V4 (=(VDD−VLC)/4+VLC) and
V5 (=VLC)
are provided from the respective output terminals of the resistor circuit means 4 as indicated in FIG. 3.

During the term of the low resistor selection signal SL is at "L" level and the high resistor selection signal SH is at "H" level, the first transfer gate transister Trg1 in the respective low resistor circuit blocks 41 to 44 turns "off" and the second transfer gate Trg3 in the high resistor circuit blocks 46 to 49 are "on".

Consequently, the low resistor circuit blocks 41 to 44 are disconnected with each other and the high resistor circuit blocks 46 to 49 are connected in serial between the power source supply VDD and the reference voltage VLC. Accordingly, the five different voltages V1 to V5 which are as the same as the voltages through the low resistor circuit blocks are supplied through the high resistor RH in the respective circuit blocks 46 to 49.

These five different output voltages V1 to V5 are provided to the output exchanger means 5 and selectively outputs by a switching operation through the output voltage terminal 6 as indicated in FIG. 4.

With an input of a synchronizing signal, the switching elements S1 to S5 are selectively turning "on". For example, in an order of S3 –S5 –S3 –S3 –S1 –S3 –S3 and so on. As a result, as shown in FIGS. 5(*d*) and 6(*d*), the step-wise varing output voltage is provided from the output terminal 6. The output voltage also turns its polarity between the source voltage VDD and the reference voltage VLD in every cycle which is responding to a cycle of the frame frequency fF.

As explained above, in order to drive a small size LC display screen, the term TS for the low resistor selection signal SH turning "on" is shorter than the term TL for a large size of a LC display drive.

According to this invention, the terms TL and Ts can be freely set in response to the various sizes of a LC display. For a large screen size of a LC display, a relative much electric current can be easily supplied without any additional resistor or IC mounting.

The first and second time setting means 1 and 2 can programmably pre-set with a certain relationship to each other. Usually, the pre-set time is determined so as to the sum of the low resistor selection time TS and the high resistor selection time TL equals to the cycle time of the frame frequency or a little bit longer than that cycle time.

It is also possible to simplify the structure of the divided resistor circuit 4 in FIG. 3. In the figure, the respective low resistor circuit blocks 41 to 44 are comprised of two transfer gates which are connected to the respective ends of the low resistor RL. However it is possible to comprise the circuit block by only one transfer gate which is connected to either side of the end of the low resistor RL.

Further the concept of this invention is applicable to another mode for driving a LC display except than the exampled ⅓ duty and ½ bait mode, for example, ⅓ duty and ⅓ bias or ¼ duty and ⅓ basic etc.

As explained above, according to the present invention, almost all size of the LC display screen can easily drive only by programmably changing the time setting for the low resistor selection time and the high resistor selection time without any mounting of an additional divided resistor or a high power IC outside or any changing of the frame frequency.

What is claimed is:

1. A drive apparatus for a liquid crystal display screen comprising:

time setting means for programmably presetting a time according to the size of said display screen;

circuit selection means for providing a low resistor selection signal and a high resistor selection signal in accordance with said pre-set time of said time setting means;

resistor circuit means including at least a first circuit block and a second circuit block coupled in parallel between a power source and a reference source, the first circuit block having a low resistor and a first switching element coupled in series to a first end of said low resistor and the second circuit block having a high resistor and a second switching element coupled in series to a first end of said high resistor; and an output exchanging means including at least one switch element corresponding to at least one output voltage from said resistor circuit means for providing said at least one output voltage to said display screen by switching said switch element in response to a frame frequency for said display screen;

wherein said circuit selection means is coupled to selectively apply said low and high resistor selection signals to said first and second switching elements, respectively, to provide said at least one output voltage through one of said low and high resistors.

2. The drive apparatus as defined by claim 1, wherein the time setting means comprises first and second means for setting time and means for presetting a low resistor selection time and a high resistor selection time.

3. The drive apparatus as defined in claim 1, wherein said circuit selection means includes counter means for setting said pre-set time and at least one reset-set type flip-flop set by a synchronizing signal and reset when said counter means counts up to said pre-set time.

4. The drive apparatus as defined by claim 1, wherein said time setting means further comprises a register circuit programmable to hold said pre-set time.

5. The drive apparatus according to claim 2, wherein said circuit selection means includes first and second counter means coupled to receive said low resistor selection time and said high resistor selection time, respectively, and first and second flip-flops responsive to output signals from said first and second counters to provide said low resistor selection signal and said high resistor selection signal, respectively.

6. The drive apparatus as claimed in claim 1, wherein the first circuit block further includes a third switching element coupled to a second end of said low resistor, said low resistor selection signal being supplied to said first switching element and said high resistor selection signal being supplied to said third switching element.

7. The drive apparatus as defined in claim 6, wherein said first and second switching elements each comprises a transfer gate transistor.

8. The drive apparatus as defined in claim 1, wherein said resistor circuit means includes a plurality of said first circuit blocks coupled in series between said power supply and said reference voltage supply and a plurality of said second circuit blocks coupled in series between said power supply and said reference voltage supply, said low resistor circuit blocks and said high resistor circuit blocks being coupled in parallel with each other for supplying a plurality of divided output voltages.

9. The drive apparatus as claimed in claim 8, wherein said first circuit block includes a third switching element coupled to a second end of said low resistor.

10. The drive apparatus as claimed in claim 8, wherein said output exchanging means includes a plurality of switching elements corresponding to a plurality of divided output voltages which are selectively switched in response to a switching signal.

11. A drive apparatus comprising:

voltage divider means including a plurality of low resistance circuit blocks coupled in series and a plurality of high resistance circuit blocks coupled in series and responsive to a resistor selection signal for supplying a plurality of divided voltages through one of said plurality of low resistance circuit blocks and plurality of high resistance circuit blocks, output exchanging means including a plurality of switching elements coupled to receive the plurality of divided voltages and responsive to a switching signal to select one of the plurality of divided voltages, and time setting means programmable to a pre-set time for providing the resistor selection signal to said voltage divider means.

12. The driver apparatus as defined in claim 11, wherein said time setting means comprises a register included in a micro-computer device.

* * * * *